(12) United States Patent
Woronuk et al.

(10) Patent No.: US 8,216,678 B2
(45) Date of Patent: Jul. 10, 2012

(54) TEMPORARY PROTECTIVE POLYMER COATING AND REMOVAL SYSTEM

(75) Inventors: Alexander Dean Woronuk, White Rock (CA); Larry Brent Taylor, White Rock (CA)

(73) Assignee: TPC Technologies Inc., Richmond, British Columbia (CA)

( * ) Notice: Subject to any disclaimer, the term of this patent is extended or adjusted under 35 U.S.C. 154(b) by 573 days.

(21) Appl. No.: 12/162,218

(22) PCT Filed: Jan. 25, 2007

(86) PCT No.: PCT/CA2007/000094
§ 371 (c)(1),
(2), (4) Date: Nov. 26, 2008

(87) PCT Pub. No.: WO2007/085080
PCT Pub. Date: Aug. 2, 2007

(65) Prior Publication Data
US 2009/0305047 A1     Dec. 10, 2009

(51) Int. Cl.
*C08K 5/101* (2006.01)
*B05D 1/02* (2006.01)
*B05D 1/18* (2006.01)
*B05D 1/28* (2006.01)
*B05D 3/10* (2006.01)
*B05D 3/12* (2006.01)

(52) U.S. Cl. ............... 428/411.1; 524/145; 524/296; 524/310; 524/314; 524/315; 524/504; 427/340; 427/355; 427/427.4; 427/428.01; 427/429; 427/430.1

(58) Field of Classification Search ............... None
See application file for complete search history.

(56) References Cited

U.S. PATENT DOCUMENTS

| | | | |
|---|---|---|---|
| 6,537,670 B1 * | 3/2003 | Sassi | 428/412 |
| 6,855,403 B2 | 2/2005 | Tysak | |
| 6,875,834 B2 | 4/2005 | Gray et al. | |
| 2004/0138328 A1 * | 7/2004 | Kohr et al. | 522/149 |
| 2007/0037923 A1 * | 2/2007 | Shiba et al. | 524/556 |

FOREIGN PATENT DOCUMENTS

CA     2452181 A1     6/2004

OTHER PUBLICATIONS

International Search Report for PCT/CA2007/000094 dated May 7, 2007, 3 pages.

* cited by examiner

*Primary Examiner* — John J Figueroa
(74) *Attorney, Agent, or Firm* — Gowling Lafleur Henderson LLP.

(57) ABSTRACT

A system for providing temporary durable protective coatings onto surfaces of building construction elements, and for controllably removing said temporary protective coatings from said surfaces. The system comprises coating compositions configured to provide pliable resilient yet durable temporary protective coverings on surfaces of building construction elements, stripping compositions configured to at least partially dissolve the temporary protective coverings, and methods for use of said coating compositions and said stripping compositions. The coating compositions are provided with at least a first component comprising a film-forming carboxylic-acid-containing polymer, a second component comprising a plasticizer chemically compatible with the first component, a third component comprising a grafting polymer suitable for forming cross-linking bonds between the first and second components, a fourth component comprising a solvent chemically suitable for solubilizing therein said first, second and third components, and a fifth component comprising a surfactant.

26 Claims, No Drawings

TEMPORARY PROTECTIVE POLYMER COATING AND REMOVAL SYSTEM

TECHNICAL FIELD

The present invention relates to temporary removable coatings configured for protecting glass and other surface-fragile substrates against scratching and abrasion damage. More particularly, this invention relates to temporary removable coatings configured for application as solutions that dry to form protective coatings overlying substrate surfaces, and to stripping compositions configured for controllably removing said protecting coatings.

BACKGROUND ART

The shipping, handling and installation of numerous components required in building construction are problematic and costly due to the fragile nature of the materials comprising these components and/or their susceptibility to permanent physical surface damage such as scratches, abrasion and scuffing incurred during shipping, handling and installation. Examples of such building components include window units comprising one or more glass panels encased in surrounding frameworks, unframed sheet glass panels, counter tops, tub and shower surrounds and other kitchen and bathroom amenities fashioned from natural and/or synthetic stone, highly polished sheet metal panels such as copper, stainless steel and aluminum, and sheet or three-dimensional building elements fashioned from fiberglass and plastics materials. Furthermore, after such components have been installed, they need to be further protected while construction is ongoing, from other types of physico-chemical damage resulting from splashing or smearing of fluid and/or semi-solid construction materials containing surface-etching or marring chemical components as exemplified by concrete, mortar, paint, deck and roofing coatings, caulking and construction adhesive materials, and the like. Quite often, the post-manufacture storage and shipping periods of such components combined with their use in long-term high-rise building construction require that the surfaces of these components are provided with a temporary removable coverings that are functional to provide protection against scratching, abrasion and scuffing damage and spillage of fluid and/or semi-solid construction materials for extended periods of time, e.g., up to one year or more.

Numerous strategies and products have been developed to temporarily protect glass and/or highly polished sheet material and/or high-gloss painted surfaces during shipping and handling. One approach known in the prior art is the application of peelable polymeric films provided with one adhesive surface to substrate surfaces for temporary removable protection against abrasion, abrasive dust and acid rain. However, disadvantages with such peelable temporary film covers include: (1) the material is easily dislodged from substrate surfaces and subsequently torn away by heavy winds, (2) prolonged adhesion of the polymeric films to substrate surfaces results in drying or chemical degradation of the adhesive components thereby making removal of the films extremely difficult without leaving behind difficult-to-remove adherent materials or without causing physical damage to the substrate surfaces, and (3) the peelable polymeric films are typically non-biodegradable and are negatively associated with disposal problems and environmental issues.

Another approach disclosed in the prior art for protecting substrate surfaces is the wet application of polymeric or metal oxide compositions that dry onto substrate surfaces thereby providing temporary protective coverings that may be removed by appropriate washing solutions. However, the problems associated with these types of temporary protective coverings include, depending on the type of composition applied: (1) long-term instability after application to substrate surfaces such as shrinkage and cracking during and after prolonged exposure to elevated environmental ambient temperatures, (2) washing away during periods of heavy rainfall, or (3) the requirement for acidic or caustic washing solutions for removal of such temporary covers from the substrate surfaces.

DISCLOSURE OF THE INVENTION

Exemplary embodiments of the present invention, at least in preferred forms, are directed to systems, compositions and methods of use for providing: (a) temporary protective durable coatings onto substrate surfaces of building construction elements that comprise at least one of glass, metal, synthetic or natural stone, fiberglass and plastics materials that are predisposed to surface damage caused by physical stresses exemplified by scratching, scuffing and abrasion, and/or by chemical stresses as exemplified by exposure to materials containing acid or caustic components and the like, and (b) compositions for controllably removing when so desired the temporary protective durable coatings from the so protected substrate surfaces.

According to a preferred embodiment, there is provided a composition for application in liquid form onto a substrate surface of a building construction element to be temporarily protected. After application, the composition dries to form a pliable and resilient yet durable and impenetrable covering over the exposed surface area of the substrate for which protection against scratches, abrasion and scuffing and other physico-chemical stresses is desired. The composition may be applied to such substrate surfaces by methods exemplified by spraying, brushing, rolling, wiping, and dipping.

According to one aspect, there is provided a coating composition for coating and temporarily protecting a substrate surface area of a building construction element, the coating composition comprising a first component selected from the group comprising carboxylic acid-containing polymers, a second component selected from the group comprising plasticizers known to be chemically compatible with the first component, a third component selected from a group of grafting polymers suitable for forming cross-linking bonds between the first and second components, a fourth component comprising a solvent such as those exemplified by glycol ethers, and a fifth component comprising a suitable surfactant. The first component is exemplified by film-forming acrylic co-polymers and acrylic polymers selected for providing durable impenetrable surfaces when dried. The second component, i.e., a plasticizer, is selected for its resilience and pliability properties and also for its chemical compatibility with the first component. The third component is exemplified by olefin acrylic grafting polymers and is selected for its chemical suitability to form "bridging" bonds between the first and second components thereby integrating resilience and pliability properties into the durable impenetrable films formed by acrylic co-polymers and acrylic polymers. The fourth component is selected to provide a desired chemical environment in a solution containing therein the composition of the present invention whereby the chemical environment is suitable for maintaining the components comprising the composition in solution. The fifth component, i.e., a surfactant is provided to facilitate the flowability of the composition of the present invention onto surface substrates and enhance the adherence of the composition thereto. Those skilled in these arts will understand that the coating compositions of the present invention configured for providing temporary durable protective coverings for building construction elements comprising glass, metal and stone materials, are exemplified by industrial floor wax compositions configured for high foot traffic areas. A sixth component comprising a short-chain alcohol may optionally be included with the coating composition of the present invention, for reducing the drying time of the coating composition after it is applied to a surface of a substrate for which a temporary durable protective coating is desired. The sixth component is a short-chain alcohol preferably selected from the group comprising methanol, ethanol, butanol and propanol, for providing increased drying efficiency i.e., by reducing the time required for the composition of the present invention to dry down into a durable coating after it is applied to a substrate surface.

According to another preferred embodiment of the present invention, there is a provided a "stripping" composition configured for controllably removing when so desired from a substrate surface of a building construction element, the temporary protective durable coating provided thereon by the coating composition of the present invention.

According to one aspect, the stripping composition comprises at least: (a) a first component configured to chemically disassociate the bonds between the first, second, and third components of the protective coating provided by the coating composition, (b) a second component selected for making the disassociated first, second, and third components of the protective coating miscible in water, and (c) a third component selected for reducing the surface tension of water contacting the stripping composition during use of the stripping composition to remove the temporary protective coating. The stripping composition is suitable for diluting with water, and/or for co-application with water. The stripping composition of the present invention is chemically configured to convert the dried-down impermeable coverings provided by the coating compositions of the present invention, into semi-solid gel-like materials that are easily solubilized and subsequently removable by a stream of water.

According to another aspect, the first component of the stripping composition comprises monoethanolamine.

According to yet another aspect, the second component of the stripping composition is exemplified by glycol ethers. A suitable glycol ether is diethylene glycol methyl ether.

According to a further aspect, the third component of the stripping composition comprises an ethoxylated alcohol.

According to another aspect, the stripping composition is applicable by a method selected from the group comprising spraying, brushing, rolling and wiping, after which, the substrate surfaces whereon the temporary protective coating is dissolving, is preferably sprayed with pressurized water to completely remove the coating while washing the underlying substrate surface.

According to yet another preferred embodiment of the present invention, there is provided a system: (a) for providing a temporary durable, scratch-, abrasion- and scuff-resistant protective coating onto a substrate surface comprising at least one of glass, metal, synthetic or natural stone, fiberglass and plastics materials, and (b) for controllably removing when so desired the temporary durable protective coating from the so protected substrate surface.

According to one aspect, the system comprises a multi-component liquid coating composition configured to form a pliable and resilient yet durable and impenetrable protective covering upon application and drying onto substrate surfaces of building construction elements, methods for applying the liquid coating composition to substrate surfaces of building construction elements to be temporarily protected, a liquid stripping composition configured to soften and solubilize a dried durable protective coating provided by the liquid coating composition of the present invention, and methods for applying said liquid stripping composition for completely removing said dried durable protective coating from a substrate surface said temporary protective coating is provided on.

According to another aspect, the multi-component liquid coating composition comprises a first component selected for forming a hard durable impenetrable film when dried, a second component comprising a plasticizer selected for its compatibility with the first component, a third component selected for its chemical suitability to form "bridging" bonds between the first and second components thereby integrating resilience and pliability properties into said hard durable impenetrable film. The fourth component comprises a solvent selected to provide a desired chemical environment in a solution containing therein the composition of the present invention, whereby the chemical environment is suitable for maintaining the components comprising the composition in solution. The fifth component comprises a surfactant provided to facilitate the flowability of the composition of the present invention onto the substrate surfaces of building construction elements and to enhance the adherence of the composition thereto. A sixth component comprising a short-chain alcohol is optionally provided for reducing the drying time of the protective coating composition of the present invention. The sixth component is a short-chain alcohol preferably selected from the group comprising methanol, ethanol, butanol and propanol, selected for reducing the drying time of the coating composition onto a substrate surface of a building construction element thereby forming a pliable and resilient yet durable and impenetrable temporary protective covering thereon.

According to a further aspect, there is provided a multi-component stripper composition chemically configured for at least partially dissolving the temporary durable coating on a substrate surface provided by a coating composition of the present invention. The multi-component stripper comprises at least: (a) a first component configured to chemically disassociate the bonds between the first, second, and third components of the protective coating provided by the coating composition, (b) a second component selected for making the disassociated first, second, and third components of the protective coating miscible in water, and (c) a third component selected for reducing the surface tension of water contacting the stripping composition during use of the stripping composition to remove the temporary protective coating. A suitable first component is monoethanolamine. A suitable second component is a glycol ether. A suitable third component is an ethoxylated alcohol.

BEST MODES FOR CARRYING OUT THE INVENTION

The present invention provides systems and compositions for protecting and controllably unprotecting the surfaces of building construction elements from surface damage caused by abrasion, scratching, scuffing, physico-chemical stresses associated with splashing or spillage of fluid construction materials, and environmental damage during post-production handling, shipping, storage, and installation activities. The systems and compositions of present invention are particularly suitable for protecting and controllably unprotecting the surfaces of building construction elements comprising substrates exemplified by: (a) sheet goods such as glass, natural and synthetic stone, polished and unpolished metals, fiberglass, plastics and the like, and (b) three-dimensional components exemplified by window and doorframes, cabinetwork, countertops, washroom amenities such as toilets, bathtubs, shower stalls, sinks, furnishings, artwork and the like.

The present invention provides multi-component temporary protective coating compositions that are applicable in liquid form to substrate surfaces for which temporary protection is desired, using a method exemplified by brushing, wiping, or spraying after which the compositions dry to form pliable and resilient yet durable and impenetrable coverings that protect the underlying substrate surfaces from abrasion, scratching, scuffing, fracturing, UV-induced discoloration, chemical discoloration caused by physical contact with objects or contact with mildly basic or acid materials commonly used by the construction trades, and other forms of surface-damaging stresses during shipping, handling, installation, and commissioning. The protective coverings dry to adhere tenaciously to the substrates and are resistant to removal by physical means such as peeling, tearing, and ripping, or by environmental pressures such as excessive precipitation, wind, UV exposure, or freeze/thaw temperature cycles. The present invention also provides stripping solutions chemically configured to at least partially dissolve the pliable and resilient yet durable and impenetrable protective coatings of the present invention overlying the surfaces of building construction elements. The at least partially dissolved protective coatings are removed from the underlying protected surfaces by washing with water as exemplified by rinsing with clear water or alternatively, by a pressurized stream of water.

The multi-component coating compositions of the present invention preferably comprise at least a carboxylic acid-containing polymer, a plasticizer known to be chemically compatible with the carboxylic acid-containing polymer, a grafting polymer suitable for forming cross-linking bonds between the carboxylic acid-containing polymer and the plasticizer, a solvent suitable for solubilizing and maintaining in solution the carboxylic acid-containing polymer, the plasticizer, and the grafting polymer, and a chemically compatible surfactant. The carboxylic acid-containing polymer is a suitable hard-film-forming polymer as exemplified by acrylic polymers, acrylic copolymers, styrene-acrylic copolymers, methylene-acrylic copolymers, ethylene-acrylic copolymers, and polyacrylamides. A suitable plasticizer is exemplified by tributoxy ethyl phosphate, phthalates, adipates, acetates, and citrates. A suitable grafting polymer is exemplified by olefin acrylic grafting polymers. A suitable solvent is at least one glycol ether exemplified by diethylene glycol methyl ether, diethylene glycol ethyl ether, ethylene glycol phenyl ether, diethylene glycol phenyl ether, diethylene glycol monobutyl ether, and dipropylene glycol methyl ether. A suitable solvent may optionally comprise a plurality of glycol ethers selected from the group comprising ethylene glycol butyl ether, diethylene glycol methyl ether, diethylene glycol ethyl ether, ethylene glycol phenyl ether, diethylene glycol phenyl ether, diethylene glycol monobutyl ether, and dipropylene glycol methyl ether. A suitable surfactant is exemplified by ethoxylated alcohols. A short-chain alcohol may optionally be incorporated into the coating composition if so desired. Alternatively, the coating compositions of the present invention may be intermixed into solutions comprising a short-chain alcohol. Suitable short-chain alcohols include methanol, ethanol, propanol and butanol. It is within the scope of the present invention for the coating compositions disclosed herein to be additionally provided with a colourant component as exemplified by pigments and dyes so that the temporary durable coatings produced therefrom are provided with a tinted or a semi-opaque or opaque property to enable easy visualization of the temporary durable coating on a substrate surface.

The multi-component stripping compositions of the present invention comprise at least three components wherein the first component is configured to chemically disassociate the bonds between the first, second, and third components of the protective coating provided by the coating composition, a second component selected for making the disassociated first, second, and third components of the protective coating miscible in water, and a third component selected for reducing the surface tension of water contacting the stripping composition. A suitable first component is exemplified by monoethanolamine. The function of the monoethanolamine is to dissolve the bonds formed between the carboxylic acid-containing polymer, the plasticizer and the grafting polymer components in the temporary protective coatings provided by the coating compositions of the present invention. A suitable second component is a glycol ether exemplified by ethylene glycol butyl ether, diethylene glycol methyl ether, diethylene glycol ethyl ether, ethylene glycol phenyl ether, diethylene glycol phenyl ether, diethylene glycol monobutyl ether, and dipropylene glycol methyl ether. It is within the scope of this invention to provide stripping compositions comprising a plurality of hydrophilic glycol ethers. The function of the glycol ether is to make the dissociated carboxylic acid-containing polymer, the plasticizer and the grafting polymer components of the temporary protective coatings miscible in water. A suitable third component is an ethoxylated alcohol. The function of the ethoxylated alcohol is to lower the surface tension of water contacting or alternatively, added to the multi-component stripping composition of the present invention so that the so contacted water becomes able to solubilize a larger portion of the dissociated carboxylic acid-containing polymer, the plasticizer and the grafting polymer components of the temporary protective coatings thereby faciliting the controllable complete removable of the temporary durable coatings when so desired.

The stripping compositions are applicable by a process exemplified by spraying, brushing, rolling and wiping. The stripping compositions will cause dissolution of the temporary durable coating causing it soften and progressively decompose and thus facilitate its removal from the substrate process by washing for example, with a pressurized stream of water.

Those skilled in these arts will understand that the multi-component coating compositions for providing temporary durable protective coatings of the present invention for surfaces of building construction elements, are exemplified by strippable industrial floor wax compositions configured for high floor traffic applications, and that the stripping compositions of the present invention are exemplified by industrial floor wax strippers chemically configured for emulsifying polymeric industrial floor wax compositions. Exemplary industrial floor wax compositions and strippers useful as coating compositions of the present invention for providing temporary durable coatings for surfaces of building construction elements are shown in Table 1.

Alternatively, the multi-component coating compositions of the present invention may be formulated by combining and mixing together in the solvent diethylene glycol ethyl ether, a carboxylic acid-containing polymer exemplified by Syntran® 1921 (Syntran® is a registered trademark of Interpolymer Corp., Canton, Mass., USA), a plasticizer exemplified by Chemcor TBEP (supplied by ChemCor, 48 Leone Lane, Chester, N.Y., USA), a grafting polymer exemplified by Syntran® PA-1465, and a surfactant exemplified by Tomadol® 23-3 (Tomadol is a registered trademark of Tomah Products Inc. 1012 Terra Drive Milton WS, USA). If so desired, polyethylene emulsion as exemplified by Syntran® 6160 may be added to the composition to provide additional film-forming properties. A short-chain alcohol as exemplified by methanol, ethanol, propanol and butanol, may optionally be added to this composition to enhance its speed of drying after application to substrate surfaces. Those skilled in these arts will understand that defoaming components exemplified by Suppressor 3110 (supplied by Interpolymer Corp., Canton, Mass., USA) may be added to the coating compositions of the present invention to minimize foaming generated by the mixing together of the above-mentioned components. Those skilled in these arts will understand that dyes and colorants may be added to the coating compositions disclosed herein so that the temporary durable coatings provided therefrom can be made if so desired, tinted or semi-opaque or opaque so that presence of the temporary durable coatings on building construction elements can be easily determined. Furthermore, providing a colourant or a dye to the coating compositions of the present invention will enable visualization and confirmation of the dissolving and complete removal of the temporary durable coatings from the building construction elements during the application and washing away of the stripping compositions from the building construction elements.

TABLE 1

| Manufacturer | Floor Wax trade name | Floor stripper trade name |
|---|---|---|
| Betco[1] Corp. | Green Earth[1] Floor Finish | Green Earth[1] Floor Stripper |
| Betco[1] Corp. | Hi-Tech[1] Floor Finish | Ax-it[1] floor stripper |
| Essential Industries Inc. | Eccothane[2] (274FF) | Green Strip (8881FX) |
| Essential Industries Inc. | Green Finish (8201FF) | Green Strip (8881FX) |
| Essential Industries Inc. | Pureshine[2] 25 (216FF) | Green Strip (8881FX) |
| Essential Industries Inc. | Solaris[2] (287FF) | Green Strip (8881FX) |
| Franklin Cleaning Technology | DE-FENCE | OFFENCE |
| Franklin Cleaning Technology | Foundation | Once Over |
| Franklin Cleaning Technology | Interstate 50 | #12 Power Stripper |
| Franklin Cleaning Technology | Nova X | Out-Strip[3] |
| JohnsonDiversey Inc. | Showplace[4] | Freedom Floor Stripper[4] |
| Pioneer Eclipse Corp. | Envirostar Green[5] Floor Coating | Envirostar Green[5] Floor Stripper |
| Spartan Chemical Co. Inc. | Glacier[6] | L.O.E. Stripper[6] |
| Spartan Chemical Co. Inc. | High Frontier[6] | N.A.D. 75 Stripper |
| Spartan Chemical Co. Inc. | Upper Limits[6] | |

[1]Betco ®, Green Earth ®, Hi-Tech ®, and Ax-It ® are trade marks owned by the Betco Corporation, Toledo, OH, USA
[2]Eccothane ®, Purshine ®, and Solaris ®, are trademarks owned by Essential Industries Inc., Merton WS, USA
[3]Out-Strip ® is a trademark owned by the Cleaning Technologies Group, Great Bend, KS, USA
[4]Showplace ® and Freedom[4] are trademarks owned by JohnsonDiversey Inc., Sturtevant, WS, USA
[5]Evirostar Green ® is a trademark owned by the Pioneer Eclipse Corp., Sparta, NC, USA
[6]Glacier ®, High Frontier ®, Upper Limits ®, L.O.E. Stripper ® are trademarks owned by the Spartan Chemical Co. Inc., Maumee, OH, USA A multi-component stripping composition of the present invention may be formulated by combining and mixing together monoethanolamine such as 2-aminoethanol SLA3955 supplied by Sciencelab.com Inc., Houston, Tex., USA, ethylene glycol butyl ether such as Butyl CELLOSOLVE® Acetate supplied by the Dow Chemical Co., Midland Mich., USA (CELLOSOLVE® is a registered trademark of the Union Carbide Corp.), and an ethoxylated alcohol such as Bio-Soft® N91-6 supplied by the Stepan Company, Northfield, Ill., USA (Bio-Soft® is a registered trademark of the Stepan Company).

While this invention has been described with respect to the preferred embodiments, it is to be understood that various alterations and modifications can be made to the system, coating compositions, stripping compositions, and methods for their use to provide and controllably remove pliable and resilient yet durable and impenetrable protective coverings onto and from building construction elements, which are limited only by the scope of the appended claims.

The invention claimed is:

1. A system for providing temporary durable protective coatings onto fragile and/or high-gloss surfaces of building construction elements and for controllably removing said temporary protective coatings, the system comprising:
   a coating composition comprising a first component comprising a film-forming carboxylic-acid-containing polymer,
      a second component comprising a plasticizer chemically compatible with said film-forming carboxylic-acid-containing polymer,
      a third component comprising a grafting polymer suitable for forming cross-linking bonds between the first and second components,
      a fourth component comprising a solvent chemically suitable for solubilizing therein said first, second and third components,
      a fifth component comprising a surfactant, and
      a sixth component comprising a short-chain alcohol selected from a group consisting of methanol, ethanol, propanol and butanol; and
   a stripping composition for dissolving said temporary durable protective coatings, the stripping composition comprising:
      (i) a monoethanolamine,
      (ii) a glycol ether selected from the group consisting of ethylene glycol butyl ether, diethylene glycol methyl ether, diethylene glycol ethyl ether, ethylene glycol phenyl ether, diethylene glycol phenyl ether, diethylene glycol monobutyl ether, and dipropylene glycol methyl ether, and
      (iii) an ethoxylated alcohol.

2. The system of claim 1, wherein the first component of the coating composition is a carboxylic-acid-containing polymer selected from a group comprising acrylic polymers, acrylic copolymers, styrene-acrylic copolymers, methylene-acrylic copolymers, ethylene-acrylic copolymers, and polyacrylamides.

3. The system of claim 1, wherein the plasticizer selected from a group consisting of tributoxyethylphosphate, phthalates, adipates, acetates, and citrates.

4. The system of claim 3, wherein the plasticizer comprises tributoxy ethyl phosphate.

5. The system of claim 1, wherein the grafting polymer is selected from a group consisting of olefin polymers.

6. The system of claim 1, wherein the grafting polymer comprises an olefin acrylic grafting polymer.

7. The system of claim 1, wherein the solvent comprises a glycol ether selected from a group consisting of ethylene glycol butyl ether, diethylene glycol methyl ether, diethylene glycol ethyl ether, ethylene glycol phenyl ether, diethylene glycol phenyl ether, diethylene glycol monobutyl ether, and dipropylene glycol methyl ether.

8. The system of claim 1, wherein the surfactant is an ethoxylated alcohol.

9. The system of claim 1, wherein the coating composition additionally comprises a colourant selected from a group consisting of pigments and dyes.

10. The system of claim 1, wherein said coating composition is applicable by a process selected from a group consisting of spraying, brushing, rolling, wiping, and dipping.

11. The system of claim 1, wherein in said stripping composition comprises a mixture of monoethanolamine, ethylene glycol butyl ether, and ethoxylated alcohol.

12. The system of claim 1, wherein said temporary durable protective coating is strippable from an underlying surface by applying said stripping composition onto the temporary durable protective coating with a process selected from a group consisting of spraying, brushing, rolling, wiping, and dipping, thereby at least partially dissolving said protective coating whereby the partially dissolved protective coating is removable by a stream of a washing liquid.

13. The system of claim 12, wherein said washing liquid is water.

14. A temporary protective coating composition for application onto fragile and/or high-gloss surfaces of building construction elements, said coating composition comprising:
 a first component comprising a film-forming carboxylic-acid-containing polymer;
 a second component comprising a plasticizer chemically compatible with said film-forming carboxylic-acid-containing polymer;
 a third component comprising a grafting polymer suitable for forming cross-linking bonds between the first and second components;
 a fourth component comprising a solvent chemically suitable for solubilizing therein said first, second and third components; a fifth component comprising a surfactant, and
 a sixth component comprising a short-chain alcohol selected from a group consisting of methanol, ethanol, propanol and butanol.

15. The temporary protective coating composition of claim 14, wherein the film-forming carboxylic-acid-containing polymer is selected from a group comprising acrylic polymers, acrylic copolymers, styrene-acrylic copolymers, methylene-acrylic copolymers, ethylene-acrylic copolymers, and polyacrylamide.

16. The temporary protective coating composition of claim 14, wherein the plasticizer is selected from a group comprising tributoxy ethyl phosphate, phthalates, adipates, acetates, and citrates.

17. The temporary protective coating composition of claim 16, wherein the plasticizer comprises tributoxy ethyl phosphate.

18. The temporary protective coating composition of claim 14, wherein the grafting polymer is selected from a group comprising olefin polymers.

19. The temporary protective coating composition of claim 18, wherein the grafting polymer comprises an olefin acrylic grafting polymer.

20. The temporary protective coating composition of claim 14, wherein the solvent comprises a glycol ether selected from a group comprising diethylene glycol methyl ether, diethylene glycol ethyl ether, ethylene glycol phenyl ether, diethylene glycol phenyl ether, diethylene glycol monobutyl ether, and dipropylene glycol methyl ether.

21. The temporary protective coating composition of claim 14, wherein the surfactant comprises an ethoxylated alcohol.

22. The temporary protective coating composition of claim 14, wherein the coating composition additionally comprises a colourant selected from a group comprising pigments and dyes.

23. A stripping composition for dissolving a temporary protective coating provided by the coating composition of claim 14, the stripping composition comprising:
 (i) a monoethanolamine;
 (ii) a glycol ether selected from a group consisting of ethylene glycol butyl ether, diethylene glycol methyl ether, diethylene glycol ethyl ether, ethylene glycol phenyl ether, diethylene glycol phenyl ether, diethylene glycol monobutyl ether, and dipropylene glycol methyl ether, and;, and
 (iii) an ethoxylated alcohol.

24. The stripping composition of claim 23, comprising monoethanolamine, ethylene glycol butyl ether, and ethoxylated alcohol.

25. A transportable article having a fragile and/or high-gloss surface with a temporary durable protective coat provided thereon by the coating composition of claim 14.

26. The transportable article of claim 25, wherein said temporary durable protective coating is dissolvable by application thereto of a stripping composition comprising:
 a monoethanolamine;
 (ii) a glycol ether selected from a group consisting of ethylene glycol butyl ether, diethylene glycol methyl ether, diethylene glycol ethyl ether, ethylene glycol phenyl ether, diethylene glycol phenyl ether, diethylene glycol monobutyl ether, and dipropylene glycol methyl ether; and
 (iii) an ethoxylated alcohol.

* * * * *